(12) United States Patent
Leong

(10) Patent No.: US 12,271,209 B2
(45) Date of Patent: Apr. 8, 2025

(54) TILT-WING AIRCRAFT

(71) Applicant: Aero Knowhow Limited, Hong Kong (CN)

(72) Inventor: Shiu Lun Leong, Hong Kong (CN)

(73) Assignee: AERO KNOWHOW LIMITED, Hong Kong (CN)

( * ) Notice: Subject to any disclaimer, the term of this patent is extended or adjusted under 35 U.S.C. 154(b) by 413 days.

(21) Appl. No.: 16/796,981

(22) Filed: Feb. 21, 2020

(65) Prior Publication Data

US 2020/0301446 A1 Sep. 24, 2020

Related U.S. Application Data

(60) Provisional application No. 62/809,759, filed on Feb. 25, 2019.

(51) Int. Cl.
*B64C 15/12* (2006.01)
*B64C 29/00* (2006.01)
(Continued)

(52) U.S. Cl.
CPC ........... *G05D 1/08* (2013.01); *B64C 29/0033* (2013.01); *B64D 31/06* (2013.01); *B64D 41/00* (2013.01);
(Continued)

(58) Field of Classification Search
CPC ...... G05D 1/08; G05D 1/101; B64C 29/0033; B64C 39/024; B64C 2201/021;
(Continued)

(56) References Cited

U.S. PATENT DOCUMENTS 3,141,633 A 7/1964 MacKay
5,141,176 A 8/1992 Kress et al.
(Continued)

FOREIGN PATENT DOCUMENTS

CN 103129737 A 6/2013
CN 105083551 A 11/2015
(Continued)

OTHER PUBLICATIONS

Suzuki et al. Attitude Control of Quad Rotors QTW-UAV with Tilt Wing Mechanism (Year: 2010).*
(Continued)

*Primary Examiner* — Elaine Gort
*Assistant Examiner* — Chanmin Park
(74) *Attorney, Agent, or Firm* — EAGLE IP LIMITED

(57) ABSTRACT

Example embodiment provides an aircraft with improved agility. The aircraft includes a main body, at least two wing assemblies, at least two motors, and a controller. The wing assemblies are attached to the main body. Each motor tilts one wing assembly with a tilting angle. The controller is connected with the motors for controlling the tilting angle of the wing assembly. Each wing assembly further includes a wing, a power plant, and a propeller that is driven by the power plant for providing propulsion. Each wing assembly tilts with an individual tilting angle, so that the aircraft can fly with improved agility. The power plants and propellers on the wings can each be controlled independently in synchronism with the tilting wings.

10 Claims, 9 Drawing Sheets

(51) Int. Cl.
*B64D 31/06* (2006.01)
*B64D 41/00* (2006.01)
*B64U 10/20* (2023.01)
*B64U 30/21* (2023.01)
*B64U 30/297* (2023.01)
*B64U 50/13* (2023.01)
*G05D 1/00* (2006.01)
*B64U 10/80* (2023.01)

(52) U.S. Cl.
CPC ............ *B64U 10/20* (2023.01); *B64U 30/21* (2023.01); *B64U 30/297* (2023.01); *B64U 50/13* (2023.01); *G05D 1/101* (2013.01); *B64U 10/80* (2023.01)

(58) Field of Classification Search
CPC .............. B64C 15/12; B64C 2201/108; B64C 2201/165; B64C 39/028; B64C 3/385; B64C 27/22; B64D 31/06; B64D 41/00; B64D 31/00; B64D 27/24
See application file for complete search history.

(56) References Cited

U.S. PATENT DOCUMENTS

| | | | |
|---|---|---|---|
| 6,276,633 B1 | 8/2001 | Balayn et al. | |
| 10,343,762 B2 | 7/2019 | Ross et al. | |
| 2008/0223994 A1 | 9/2008 | Greenley | |
| 2014/0008498 A1 | 1/2014 | Reiter | |
| 2018/0178899 A1 | 6/2018 | Har et al. | |
| 2019/0168622 A1* | 6/2019 | McRoberts | B60L 50/15 |
| 2021/0354811 A1* | 11/2021 | Suzuki | B64C 27/28 |
| 2021/0371096 A1* | 12/2021 | Anderson | B64C 29/0033 |

FOREIGN PATENT DOCUMENTS

| | | | | |
|---|---|---|---|---|
| CN | 108181924 A | * | 6/2018 | ............ G05D 1/101 |
| CN | 207917144 U | | 9/2018 | |
| CN | 208915438 U | | 5/2019 | |
| CN | 110001928 A | | 7/2019 | |
| EP | 3492371 A1 | | 6/2019 | |
| KR | 20140058854 A | * | 5/2014 | |
| KR | 20170074539 A | * | 6/2017 | |
| WO | WO-2018147810 A1 | * | 8/2018 | ............ B64C 27/22 |

OTHER PUBLICATIONS nlr.org "NLR-provides-important-contribution-to-european-tiltrotor-research", [retrieved on Apr. 21, 2020] retrieved from Internet <URL:https://www.nlr.org/news/nlr-provides-important-contribution-to-european-tiltrotor-research/> Originally published on Jul. 9, 2013 (Jul. 9, 2013); p. 3.

* cited by examiner

TILT-WING AIRCRAFT

FIELD OF INVENTION

This invention relates to a tilt-wing aircraft, such as a miniature unmanned aerial vehicle (UAV).

BACKGROUND OF INVENTION

Heavier-than-air type aircraft, or aerodynes, are characterized by one or more wings and a central fuselage. The fuselage typically also carries a tail or empennage for stability and control, and an undercarriage for takeoff and landing. Engines may be located on the fuselage or wings. On a fixed-wing aircraft the wings are static planes rigidly attached to the fuselage and extending either side of the aircraft. When the aircraft travels forwards, air flows over the wings which are shaped to create lift. On a rotorcraft the wings are attached to a rotating shaft to provide lift throughout the entire flight, such as helicopters, autogyros, and gyrodynes.

New type aircraft with improved flying performance is desirable to meet the advancing technological need.

SUMMARY OF INVENTION

One example embodiment provides an aircraft with improved agility. The aircraft includes a main body, two wing assemblies, two motors, and a controller. The wing assemblies are attached at lateral of the main body. Each wing assembly further includes a wing that extends from lateral of the main body and is tiltable around an axis vertical to the lateral of the main body, one power plant such as a motor or an engine that is configured on the wing, and one propeller that is driven by the power plant for providing propulsion. The rotating plane of the propeller is vertical to the plane of the wing. Each motor tilts one wing assembly with a tilting angle. The controller is connected with the motors and provides a control signal to the motors to control the tilting angle of the wing assembly. Each wing assembly tilts with an individual tilting angle when the aircraft is flying, so that the aircraft can fly with improved agility.

Another example embodiment provides a method for controlling an attitude of an aircraft. The aircraft includes a controller and two wing assemblies. The wing assemblies extend from lateral of a main body and are driven by two motors respectively. The method including the following steps: determining a current flying attitude of the aircraft according to measurements of a plurality of sensors by a controller; calculating a first tilting angle of the first wing assembly according to the current flying attitude and a desired flying attitude by the controller; calculating a second tilting angle of the second wing assembly according to the current flying attitude and the desired flying attitude by the controller; providing a first torque to the first wing assembly to tilt the first wing assembly with the first tilting angle by the first motor; providing a second torque to the second wing assembly to tilt the second wing assembly with the second tilting angle by the second motor; and controlling the attitude of the aircraft by tilting the first wing assembly with the first tilting angle and tilting the second wing assembly with the second tilting angle simultaneously and respectively.

Other example embodiments are described herein.

DETAILED DESCRIPTION

Figure 1:
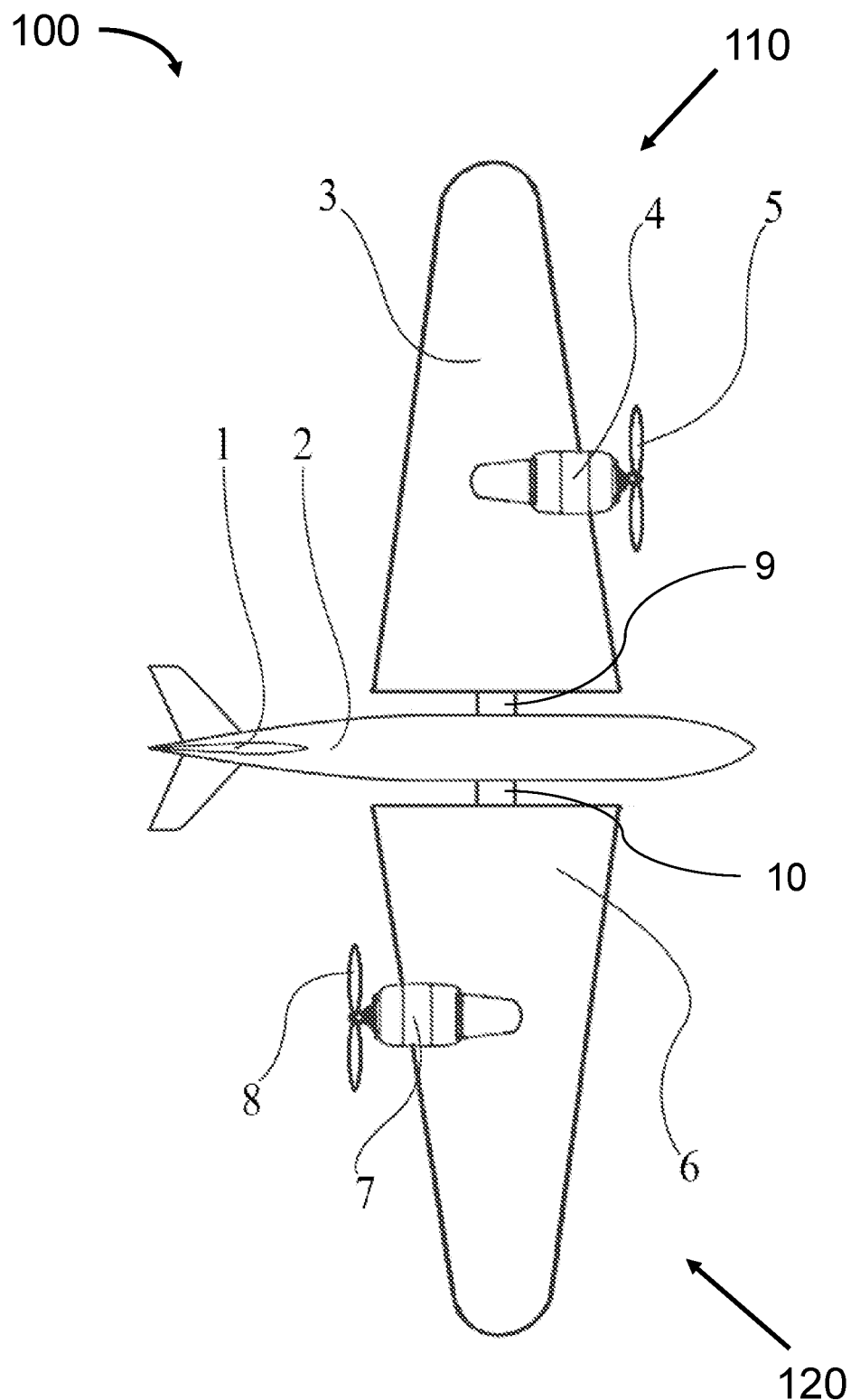
FIG. 1 shows a top view of a tilt-wing aircraft in accordance with an example embodiment.

As used herein and in the claims, "comprising" means including the following elements but not excluding others.

As used herein and in the claims, "attitude" refers to the orientation of the craft with respect to a set of reference axes.

A vertical take-off and landing (VTOL) aircraft is one that can hover, take off, and land vertically. By taking off directly into the air without the need for a runway, vertical take-off and landing (VTOL) craft require less physical space and infrastructure to get into the air, which is a necessary feature especially for a miniature UAV.

Conventional VTOL aircraft includes a variety of types of aircraft including helicopters, quadrotors, tilt-wing aircraft, and other aircraft with powered rotors, such as tiltrotors. A tilt-wing aircraft features a wing that is horizontal for conventional forward flight and rotates up for vertical take-off and landing. A tiltrotor is an aircraft which generates lift and propulsion by way of one or more propeller mounted on rotating engine pods usually at the ends of a fixed wing, where only the propeller and engine rotate. Whilst conventional tilt-wing and tiltrotor aircraft combine the vertical lift capability of a helicopter with the speed and range of a conventional fixed-wing aircraft, they focus on better horizontal flying efficiency while the agility of the aircraft is rarely discussed.

Example embodiments improve the flying performance of the aircraft over conventional designs by providing agility and aerobatic ability unmatched by conventional designs, in the meantime, maintaining a comparable aerodynamic efficiency of fixed wing aircraft and the vertical take-off capability. Comparing with conventional designs that tilt the wings and/or rotors with the same angle, example embodiments can achieve high agility by swift tilting each of the wings, which carries the propeller and engine, individually, and at a tilting angle much larger than that in conventional designs.

The individually tilting wings provide better aerodynamics and hence higher efficiency than conventional designs during normal flight. For example, the swift tilting of the wings collaboratively changes the direction of the propelling power and the aerodynamics of the wing so as to provide high agility in maneuvers, such as change of flying direction and flipping over of the aircraft body. Each individual wing's direction can be changed at any angle from 0 to 360 degree, so that the wing can provide lift as well as air-braking in rapid landing and aerobatics by changing the tilting angle. Combining lift at one wing and air-braking at the other wing can lead to twisting and turning of the aircraft body in 6-axis, so that the agility and maneuverability is greatly improved. Example embodiments also employ one or more servo systems to adjust the individual power output of the engines to aid better balancing and agility.

One example embodiment provides an aircraft with improved agility. The aircraft includes a main body, two wing assemblies, two motors, and a controller. The wing assemblies are attached at lateral of the main body. Each wing assembly further includes a wing that extends from lateral of the main body and is tiltable around an axis vertical to the lateral of the main body, one power plant that is configured on the wing, and one propeller that is driven by the power plant for providing propulsion. The rotating plane of the propeller is vertical to the plane of the wing. Each motor tilts one wing assembly with a tilting angle. The controller is connected with the motors and provides a control signal to the motors to control the tilting angle of the wing assembly. Each wing assembly tilts with an individual tilting angle when the aircraft is flying, so that the aircraft can fly with improved agility.

By way of example, the two wing assemblies are attached to the opposite sides of the main body symmetrically via shafts, and each shaft being driven by the corresponding motor.

By way of example, the aircraft further includes a sensor for sensing an actual tilting angle of each wing assembly, and sending the actual tilting angle to the controller. The controller further controls power output of each power plant according to the actual tilting angle of the wing assembly.

By way of example, the aircraft further includes a plurality of sensors for measuring parameters of the aircraft. The sensors include one or more of an accelerometer, a gravity sensor, a digital compass, a Global Positioning System (GPS), a temperature sensor, a wind sensor and cameras. The controller provides the control signal based on the sensors' measurements.

By way of example, a tiltable angle of each wing assembly is at any angle from 0 to 360 degree.

By way of example, the controller further includes a transmitter that transmits the control signal and a receiver that receives the control signal via wireless communication and control the tilting angle of the wing assembly.

By way of example, the aircraft is a miniature unmanned aerial vehicle (UAV).

One example embodiment provides a method for controlling an attitude of an aircraft. The aircraft includes a controller and two wing assemblies. The wing assemblies extend from lateral of a main body and are driven by two motors respectively. The method including the following steps: determining a current flying attitude of the aircraft according to measurements of a plurality of sensors by a controller; calculating a first tilting angle of the first wing assembly according to the current flying attitude and a desired flying attitude by the controller; calculating a second tilting angle of the second wing assembly according to the current flying attitude and the desired flying attitude by the controller; providing a first torque to the first wing assembly to tilt the first wing assembly with the first tilting angle by the first motor; providing a second torque to the second wing assembly to tilt the second wing assembly with the second tilting angle by the second motor; and controlling the attitude of the aircraft by tilting the first wing assembly with the first tilting angle and tilting the second wing assembly with the second tilting angle simultaneously and respectively.

In one example embodiment, each wing assembly further includes a power plant and a propeller driven by the power plant, and the method further includes the following steps: calculating a first power output for the first power plant by the controller; calculating a second power output for the second power plant by the controller; providing, the first power output to the first propeller by the first power plant; and providing the second power output to the second propeller by the second power plant. In one example embodiment, the first and second power plant can provide appropriate power in synchronism with the tilting wings to maintain balance of the aircraft according to the control instructions inputted to the system.

With the wing assemblies tilting at different angles and correspondingly power plants adjusting the output power for the propellers, example embodiments can achieve a variety of flying attitudes with great agility, such as vertical taking off/landing, hovering, flying forward, accelerating, flying backward, decelerating, turning right/left, flipping over, and etc.

In the following descriptions, the same numbering in different figures is used to indicate the same component/part. The terms related to directions, such as "forward", "backward", "upwards", "downwards", "left", "right", etc. are for convenience of description and better understanding of the invention, and thus will not limit the example embodiments.

FIG. 1 shows a top view of a tilt-wing aircraft 100 in accordance with an example embodiment.

Referring to FIG. 1, the aircraft 100 includes a main body 2. A tail 1 is configured at the rear part of the main body 2 for keeping balance. A left wing assembly 110 and a right wing assembly 120 are attached at the lateral of the main body 2 respectively. The left wing assembly 110 further includes a left wing 3 that is connected to the main body 2 by a shaft 9, a left power plant 4 that is fixed on the left wing 3, and a left propeller 5 that is driven by the power plant 4 for providing propulsion. The right wing assembly 120 has the same structure with the left wing assembly 110. It includes a right wing 6 that is connected to the main body 2 by a shaft 10, a right power plant 7 that is fixed on the right wing 6, and a right propeller 8 is driven by the right power plant 7 for providing propulsion for the aircraft 100.

The wings 3 and 6 extend from the lateral of the main body 2 and can rotate around the shafts 9 and 10 which are vertical to the lateral of the main body 2. The power plant 4 and 7 are fixed on the wings 3 and 6 respectively and each drives one propeller 5 and 8. The rotating planes of the propellers 5 and 8 are vertical to the plane of the wings 3 and 6. When the wing assemblies 110 and 120 tilt around the shafts 9 and 10, the propelling direction of the propellers 5 and 8 changes accordingly.

The aircraft 100 further includes two motors (not shown) for providing torques to rotate the shafts 9 and 10, and thus tilt the wing assemblies 110 and 120 with a tilting angle. The motors are connected to a controller (not shown). For example, the motors and the controller are embedded inside the main body 2. The controller provides a control signal to a motor driver (not shown) that drives the corresponding motors, and thus control the tilting angle of the wing assemblies 110 and 120 by controlling the output of the motors. As each motor can output an individual torque to the shaft, the left wing assembly 110 and the right wing assembly 120 can tilt with different tilting angles.

The aircraft 100 can fly in a fixed wing mode or a tilt-wing mode. When flying in the fixed wing mode, it is aerodynamically similar to a normal fixed wing aircraft, while in a tilt-wing mode, it can provide high agility and aerobatic ability with differential tilting of the wing assemblies.

When the aircraft 100 is flying in a tilt-wing mode, the controller calculates a desired tilting angle of the wing assemblies 110 and 120 according to the flying attitude and generates control signals for the motors respectively. Each motor provides an individual output torque to tilt the corresponding wing assembly with an individual tilting angle via the corresponding shaft. As shown in FIG. 1 for an example, the left wing assembly 110 tilt forward so that the rotating plane of the left propeller 5 is facing forward, while the right wing assembly 120 tilt backward so that the rotating plane right propeller 8 is facing backward.

In one example embodiment, the controller also calculates an output for each power plant, so that the propulsion of each propeller is adjusted accordingly. By rapid tilting of each wing assembly in sync with the power output of the power plant controlled by the controller, high agility of the aircraft is achieved.

In one example embodiment, the two wing assemblies 110 and 120 are symmetrically attached to the opposite sides of the main body 2.

In one example embodiment, the tiltable angle of the two wing assemblies 110 and 120 are 180 degree forward/backward.

In one example embodiment, the aircraft 100 may include more than two wing assemblies.

In one example embodiment, the power plant 4 and 7 are engines. By way of example, the engines can change the direction of output power.

In one example embodiment, the main body 2 can be an aircraft body, an airship, a tube frame, a wire frame, etc., or a combination thereof. The shape of the main body 2 in FIG. 1 is for example only, and it may be of other shapes in different example embodiments. The tail 1 may be a set of tail fins for stabilization. In some example embodiment, there may be no tail if the stabilization can be achieved by other mechanism.

In one example embodiment, the aircraft is an unmanned aerial vehicle. By way of example, the aircraft may be a flying machine toy.

Figure 2:
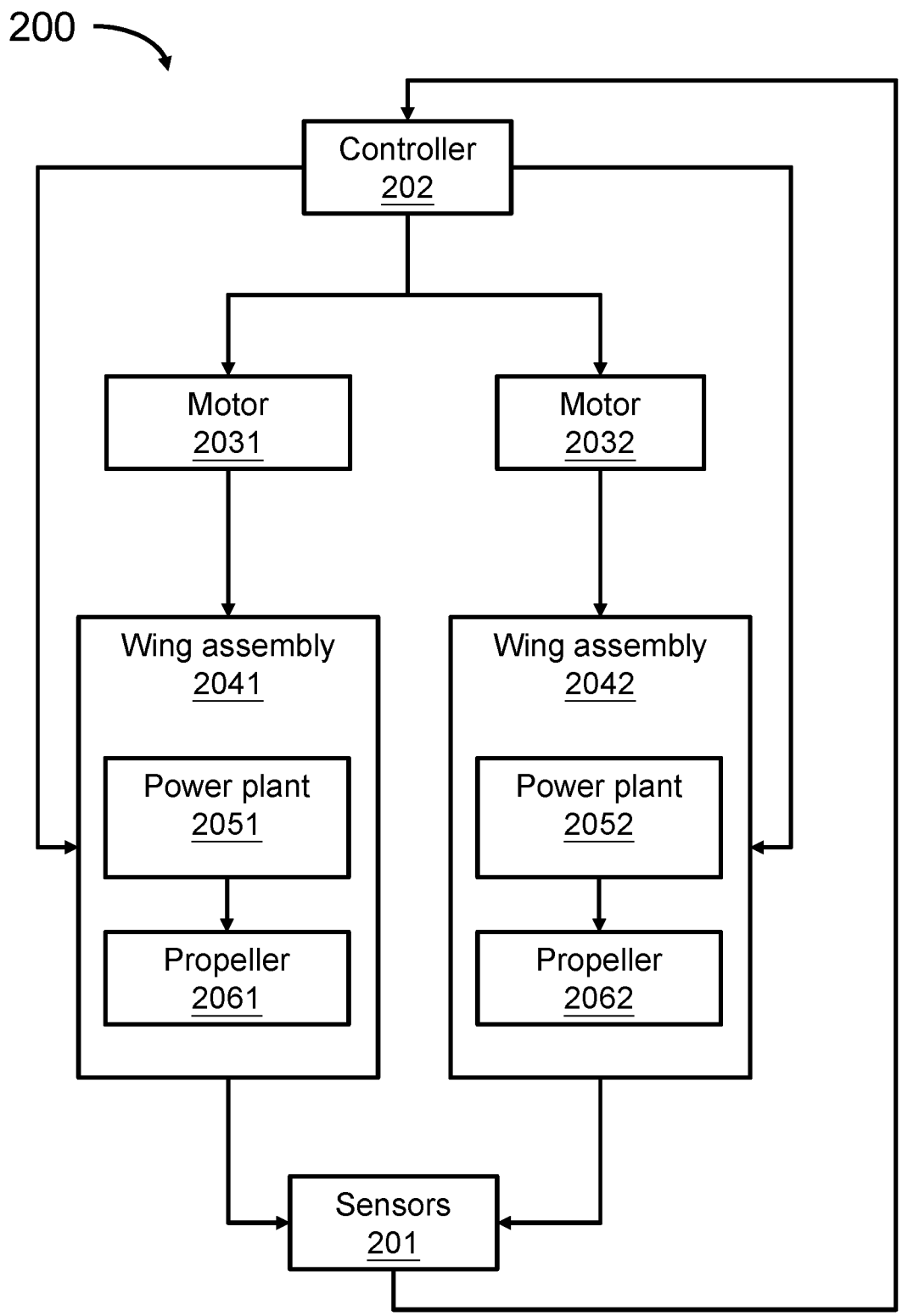
FIG. 2 shows a block diagram of a tilt-wing aircraft control system in accordance with an example embodiment.

FIG. 2 shows a block diagram of a tilt-wing aircraft control system 200 in accordance with an example embodiment.

The control system 200 includes sensors 201, a controller 202, two motors 2031 and 2032, two wing assemblies 2041 and 2042. The wing assembly 2041 consists of a power plant 2051 and a propeller 2061. The wing assembly 2042 consists of a power plant 2052 and a propeller 2062.

The controller 202 are connected with the sensors 201 for receiving measurements therefrom, and connected with the motors 2031 and 2032, and the wing assemblies 2041 and 2042 for providing control signals thereto.

In one example embodiment, the sensors 201 includes one or more of an accelerometer, a gravity sensor, a digital compass, a Global Positioning System (GPS), a temperature sensor, a wind sensor and cameras for sensing the parameters of the aircraft and the environment around the aircraft.

By way of example, the sensors 201 measure an actual tilting angle of each wing assembly, and sending the actual tilting angle to the controller 202. Based on the measurements and the input desired flying attitude, the controller 202 calculates and provides a first groups of control signals to the motors 2031 and 2032 for controlling the output power of the motors 2031 and 2032 to tilt the wing assemblies 2041 and 2042 respectively, and provides a second groups of control signals to control power output of each power plant 2051/2052 that actuates the propellers. Since the control signal for the motors 2031 are independent from that for the motor 2032, the tilting angle of the wing assembly 2041 is independent from that of the wing assembly 2042.

By way of example, the sensors 201 monitor the tilting angle of the wing assemblies 2041 and 2042 and feedback the information to the controller 202 continuously, so that the controller can adjust the control signal until the desired flying attitude is achieved.

By way of example, the motors 2031 and 2032 can be servo motors with or without reduction gearbox, servo mechanism or a hydraulic servo mechanism. The calculation method of the controller 202 can be artificial intelligent (AI) algorithms for automatic stabilization of the aircraft or perform the instructed aerobatic maneuvers. In one example embodiment, the calculation method can be a self-tuning control algorithm and/or a deep learning algorithm that learn the previous control action and the consequential behavior of the aircraft from sensors feedback such as accelerometers and gyroscopes for improved control action in the next incident.

By way of example, the controller 202 includes a microcontroller and/or FPGAs.

By way of example, the controller 202 includes a wireless transmitter and receiver. The transmitter transmits the control signals remotely and the receiver, which is connected with the motors, receives the control signals via wireless communication and controls the output of the motors, in turn the tilting angle of each wing assembly.

Figure 3:
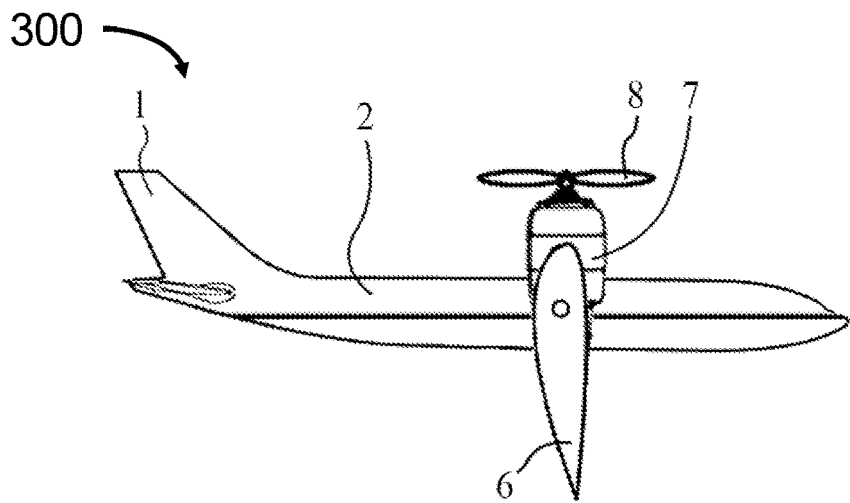
FIG. 3-5 show different flying attitudes of a tilt-wing aircraft in accordance with example embodiments.
Figure 4:
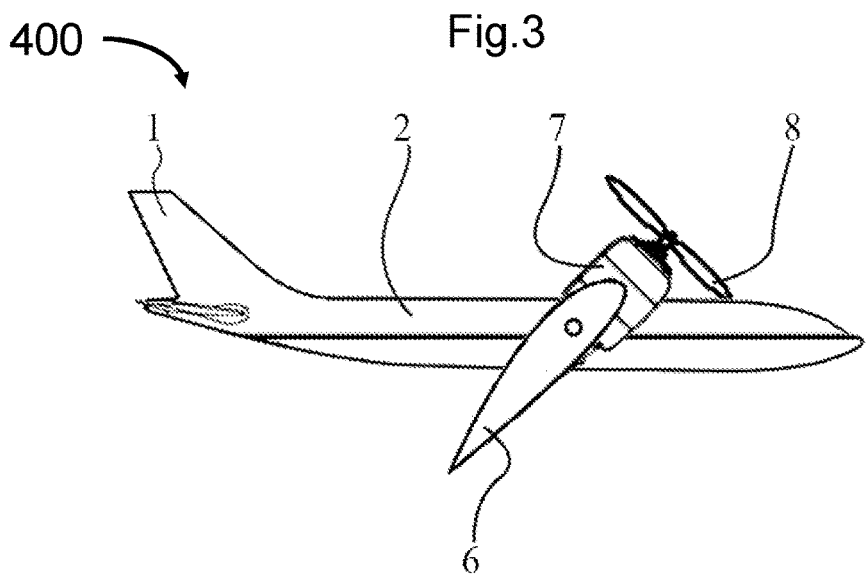
Figure 5:
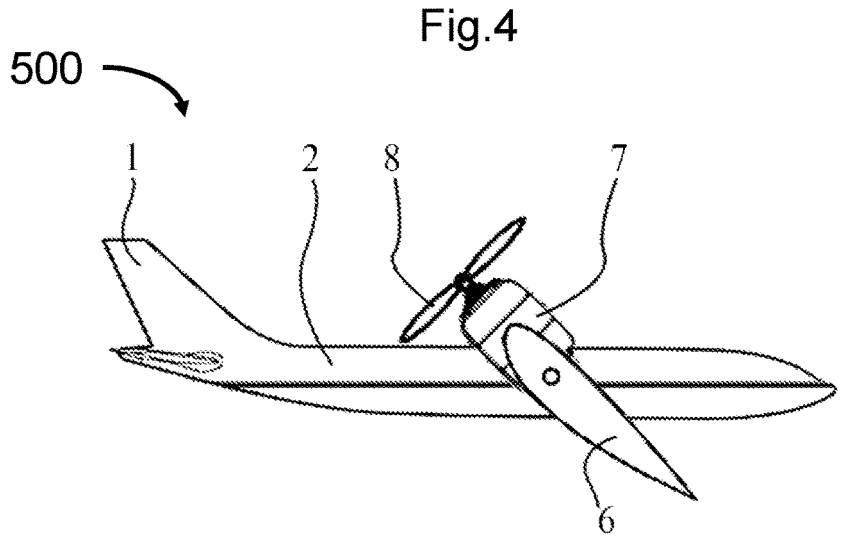

FIGS. 3-5 show different flying attitudes of a tilt-wing aircraft in accordance with example embodiments. As FIGS. 3-5 are the side view of the aircraft, the left wing 3 and the left propeller 5 and left power plant 4 affixed to left wing 3 are not shown in these figures.

FIG. 3 shows the aircraft 300 at the vertical lift-off or hovering state with the wings 3 and 6 rotated approximately 90 degrees upward from horizontal simultaneously, while the angle of tilt of each wing and the output power of their respective power plant 4 and 7 can be fine-tuned continuously in synchronism to maintain balance of the aircraft.

FIG. 4 shows the aircraft 400 is hovering forward or accelerating to transit from hover to normal horizontal flight with the wings 3 and 6 tilting forward simultaneously, while each of the power plant 4 and 7 adjusts their power output corresponding to the tilting angle of their respective wings 3 and 6 to provide balance and motion of the aircraft.

FIG. 5 shows the aircraft 500 is hovering backward or decelerating to prepare for manoeuvres such as landing. This manoeuvre is performed with the wings 3 and 6 tilting backward simultaneously, while each of the power plant 4 and 7 adjust their power corresponding to the tilting angle of their respective wings 3 and 6 to provide balance and motion of the aircraft.

In the flying attitude of FIGS. 3-5, the tilting angles of the wings 3 and 6 may have slightly difference to keep balance and directional stability of the aircraft.

Figure 6A:
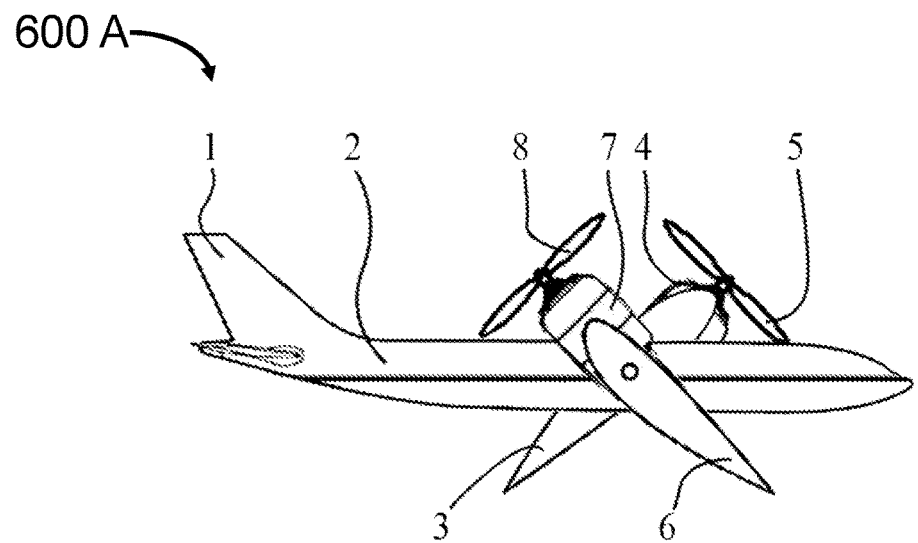
FIG. 6A and 6B show a side view and a top view of a tilt-wing aircraft turning right in accordance with an example embodiment.
Figure 6B:
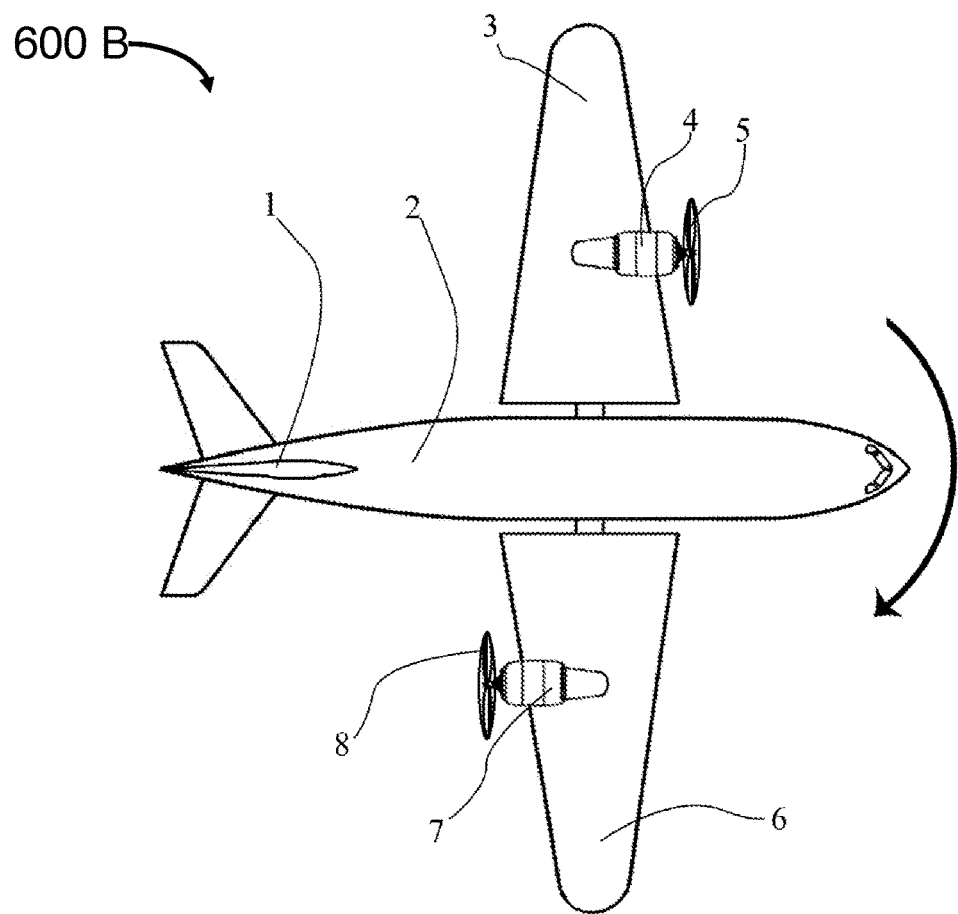

FIG. 6A and 6B show a side view 600A and a top view 600B of a tilt-wing aircraft making a right turn maneuver during hovering or spiraling upwards/downwards by tilting the left wing 3 forward while tilting the right wing 6 backward simultaneously and respectively, and each of the power plant 4 and 7 adjusting their power corresponding to the tilting angle of their respective wings 3 and 6 to provide balance and motion of the aircraft.

Figure 7A:
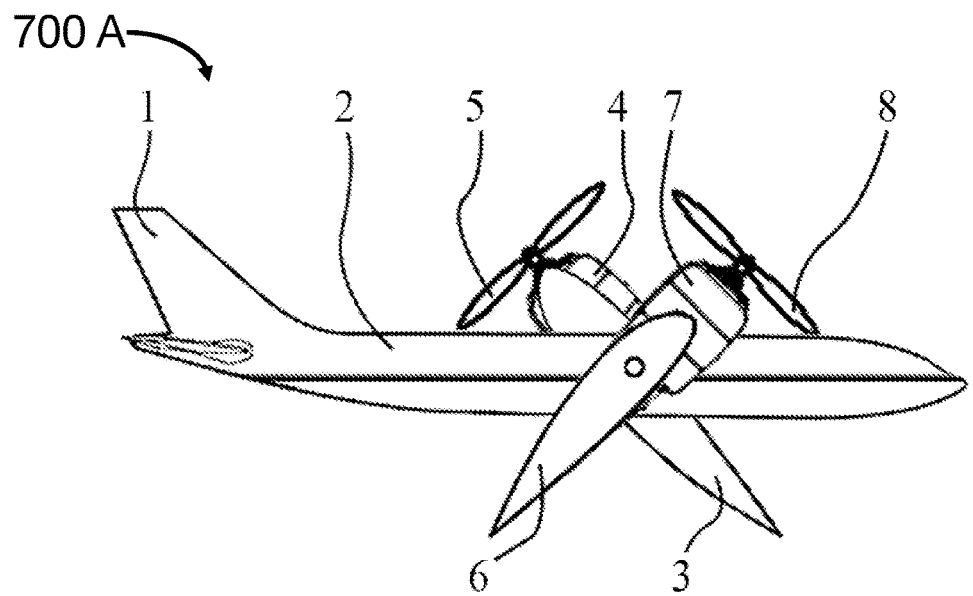
FIG. 7A and 7B show a side view and a top view of a tilt-wing aircraft turning left in accordance with an example embodiment.
Figure 7B:
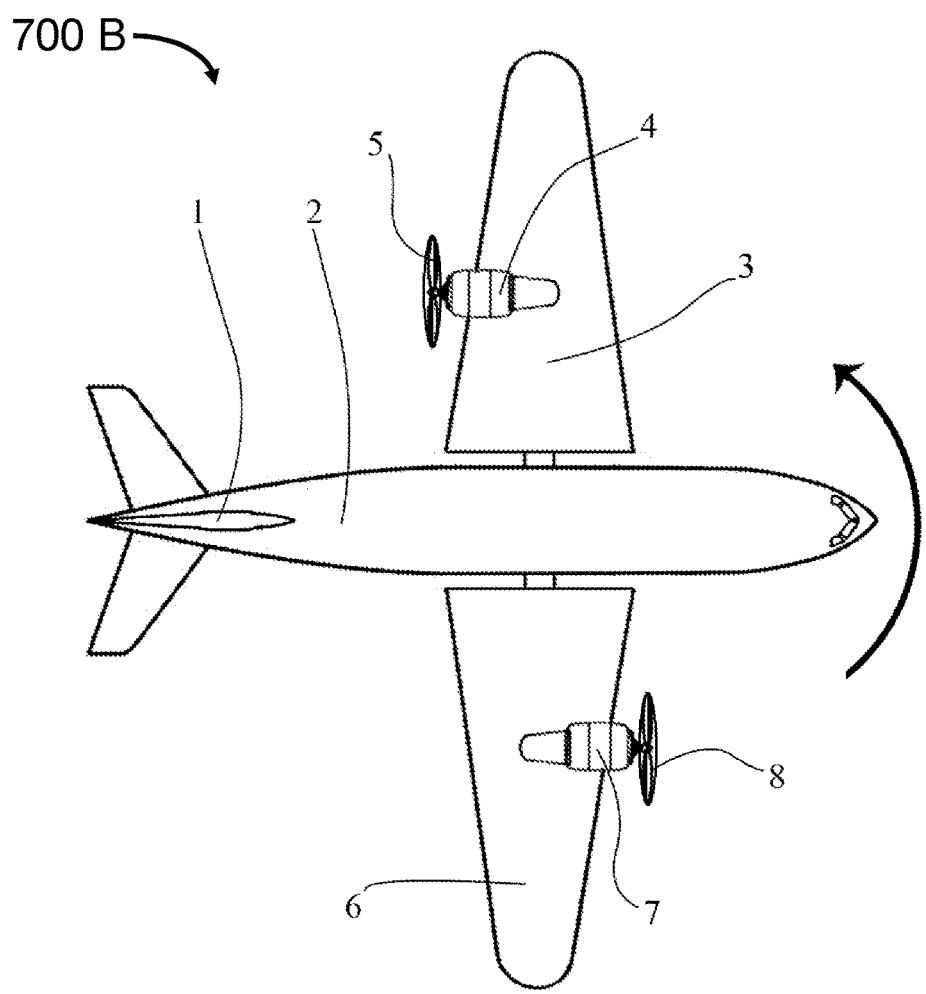

FIG. 7A and 7B show a side view 700A and a top view 700B of a tilt-wing aircraft making a left turn manoeuvre during hovering or spiraling upwards/downwards. The left wing 3 tilts backward while the right wing 6 tilts forward simultaneously and respectively. Each of the power plant 4 and 7 adjusts their power corresponding to the tilting angle of their respective wings 3 and 6 to provide balance and motion of the aircraft. By way of example, the tilting angles of the wings 3 and 6 are in the range of 0 to +/− 90 degrees from a vertical axis depending on the desired turning speed.

Figure 8:
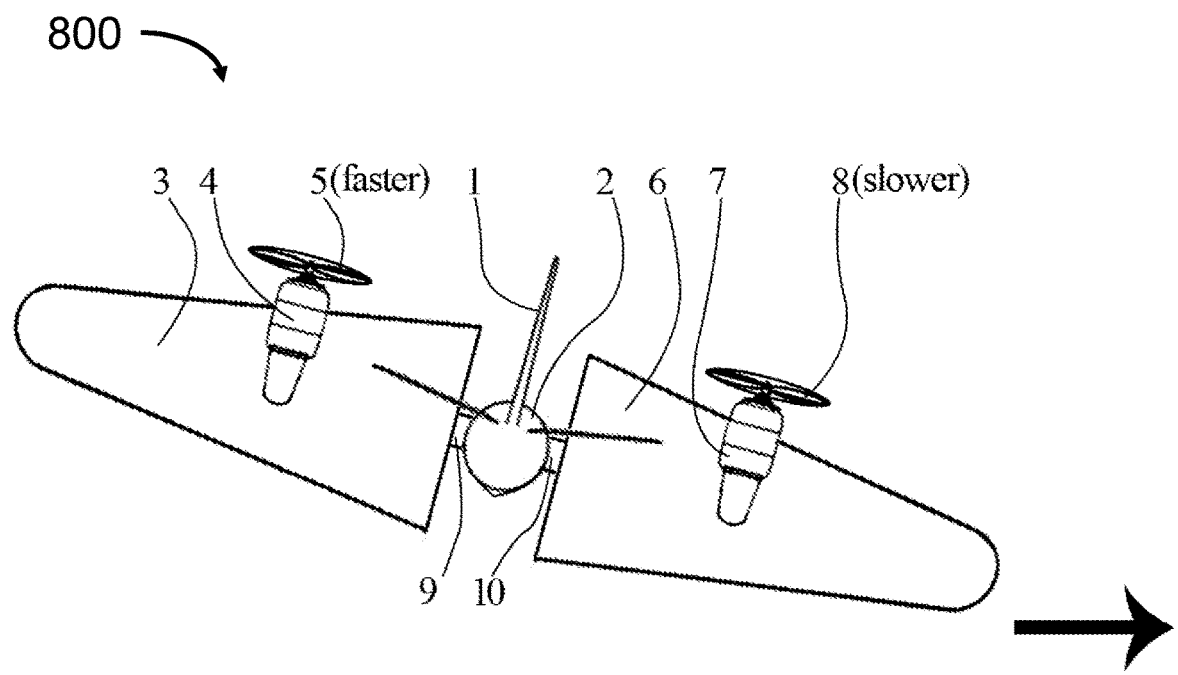
FIG. 8 shows a rear view of a tilt-wing aircraft shifting right in accordance with an example embodiment.

FIG. 8 shows a rear view 800 of a tilt-wing aircraft shifting right during hovering, lifting and landing with the left wings 3 and right wing 6 tilting upwards, i.e., approximately 90 degrees from the horizontal position, by left shaft 9 and right shaft 10 respectively, while the power plant 4 maintains a slightly higher power than that of power plant 7, or alternatively, the propeller 5 maintains a slightly higher speed than the propeller 8.

Figure 9:
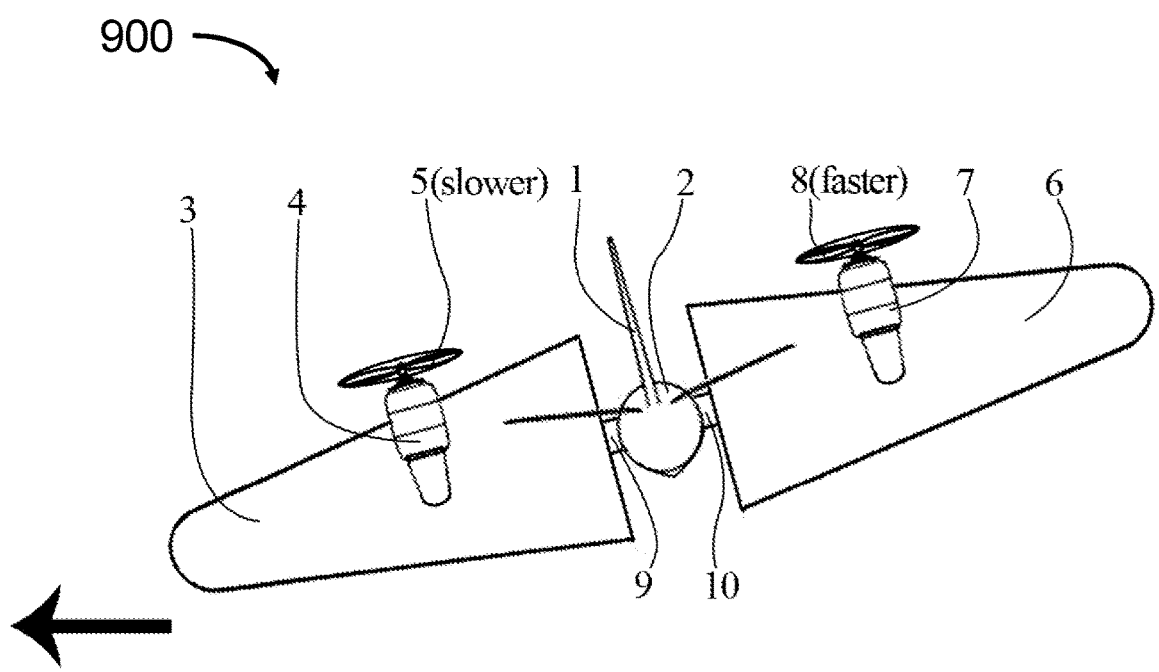
FIG. 9 shows a rear view of a tilt-wing aircraft shifting left in accordance with an example embodiment.

FIG. 9 shows a rear view 900 of a tilt-wing aircraft shifting left during hovering, lifting and landing. The left wings 3 and right wing 6 tilt upwards, i.e., approximately 90 degrees from horizontal position, while the power plant 4 maintains a slightly lower power than that of power plant 7, or alternatively, the propeller 5 maintains a slightly lower speed than the propeller 8.

Figure 10:
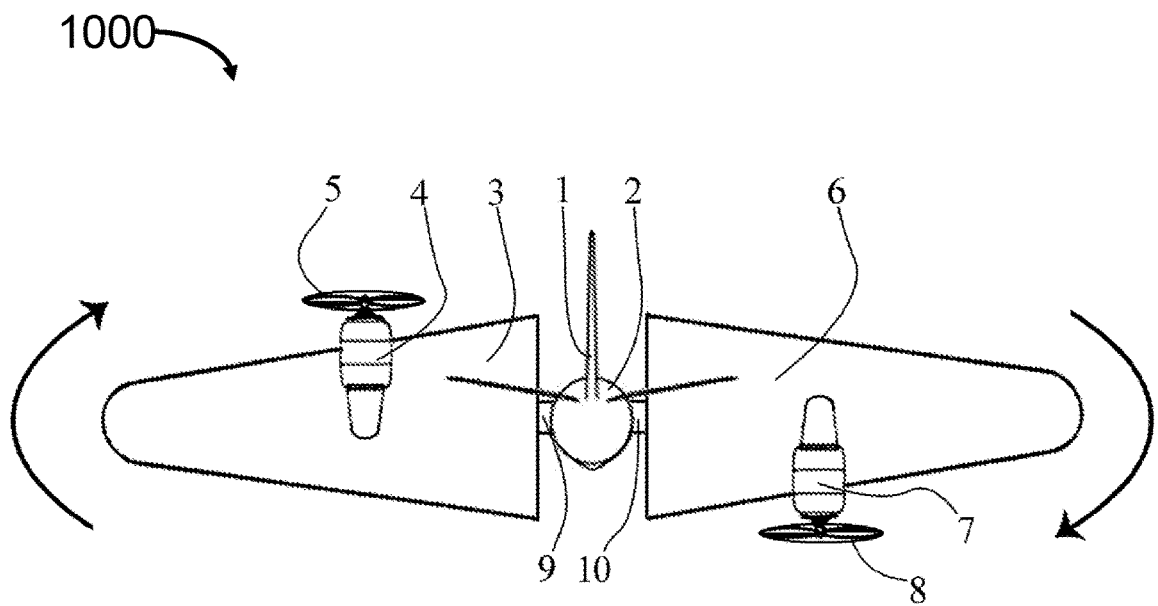
FIG. 10 shows a rear view of an aircraft rotating around the main body in accordance with an example embodiment.

FIG. 10 shows a rear view 1000 of an aircraft rotating clockwise around the main body 1 in-flight or hovering. The left wing 3 tilts upwards approximately 90 degrees from horizontal while the right wing 6 tilts downwards around the shafts 9 and 10 respectively. Each power plant 4 and 7 adjusts their power corresponding to the tilting angle of their respective wings 3 and 6 to provide balance and motion of the aircraft. In a similar way, the counter-clockwise rotation of the aircraft around the main body 1 can be performed with wings 3 and 6 reversing the positions by 180 degrees as in FIG. 10.

Figure 11:
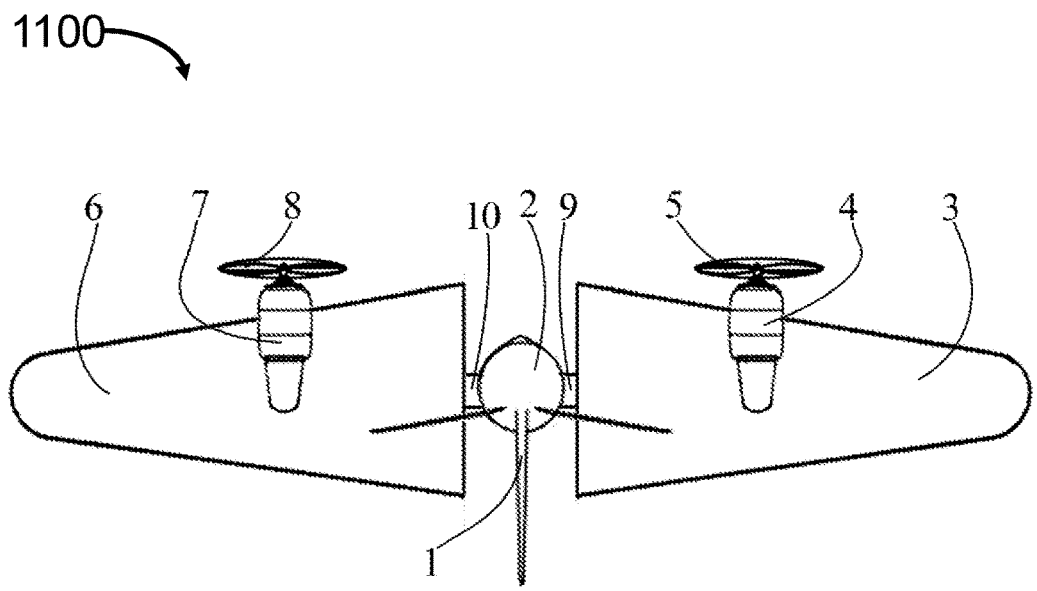
FIG. 11 shows a rear view of a flipped over tilt-wing aircraft hovering in accordance with an example embodiment.

FIG. 11 shows a rear view 1100 of a flipped over tilt-wing aircraft hovering upside down. Both wings 3 and 6 are rotated approximately 90 degrees downwards from horizontal position. The transition from normal flying position to this upside-down position can be achieved by rapid tilting of the wings to rotate the aircraft as in FIG. 10 and rapid tilting of the left wing 3 to this state, and with the corresponding adjustment of power from power plant 4 and 7 to balance and maintain the aircraft in an upside-down position.

Figure 12:
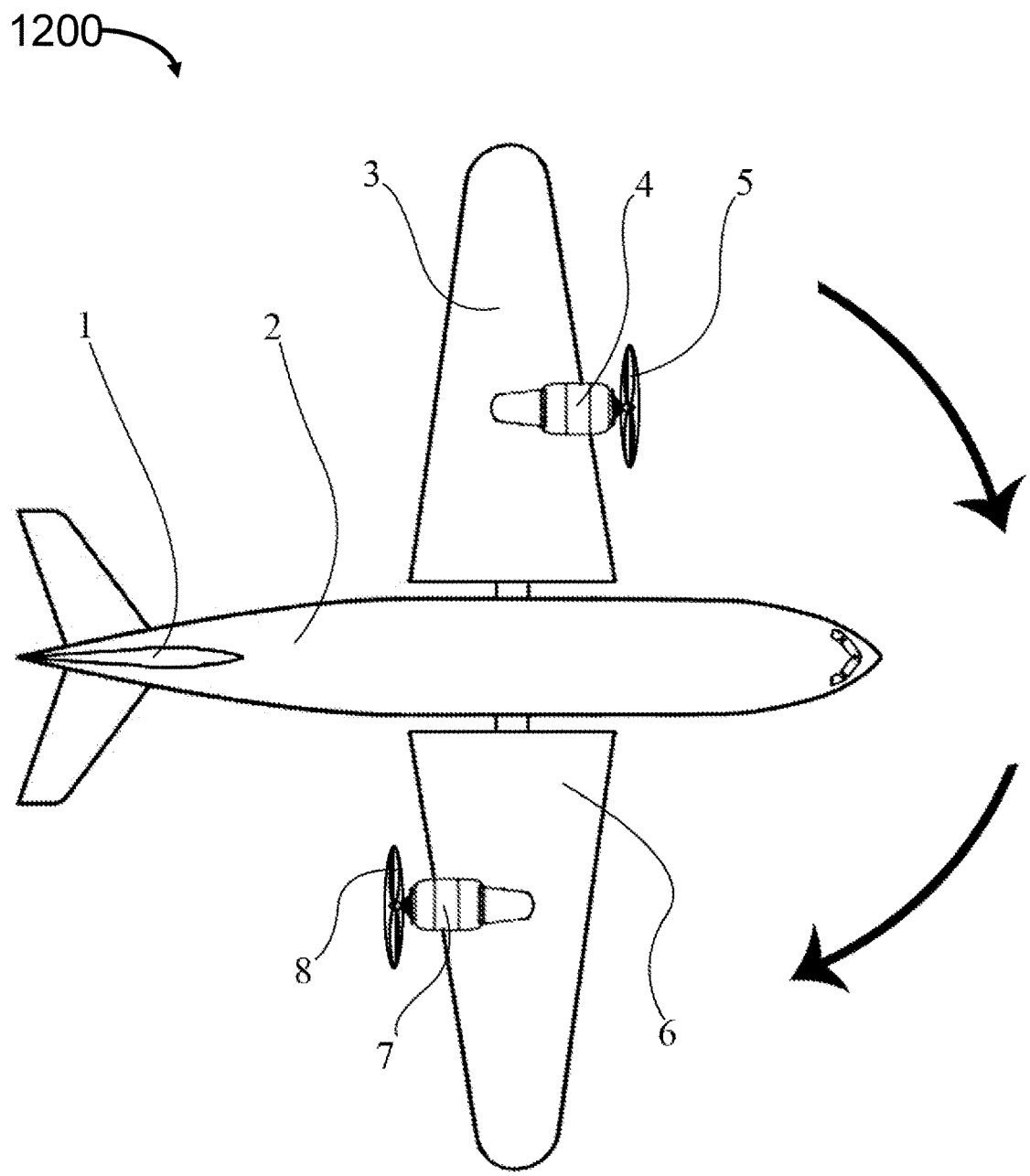
FIG. 12 shows a top view of a tilt-wing aircraft turning clockwise in accordance with an example embodiment.

FIG. 12 shows a top view 1200 of a tilt-wing aircraft making an extremely aggressive right turn or clockwise rotation during flight. This manoeuvre can be achieved by tilting the right wing 6 backward with 180 degrees, and tilting the left wing 3 forward with 180 degrees simultaneously and respectively. The power output from power plant 4 and 7 are adjusted accordingly to balance the aircraft. Similarly, the aircraft can make the aggressive left turn or anti-clockwise rotation by tilting the wings 3 and 6 in an opposite direction.

Figure 13:
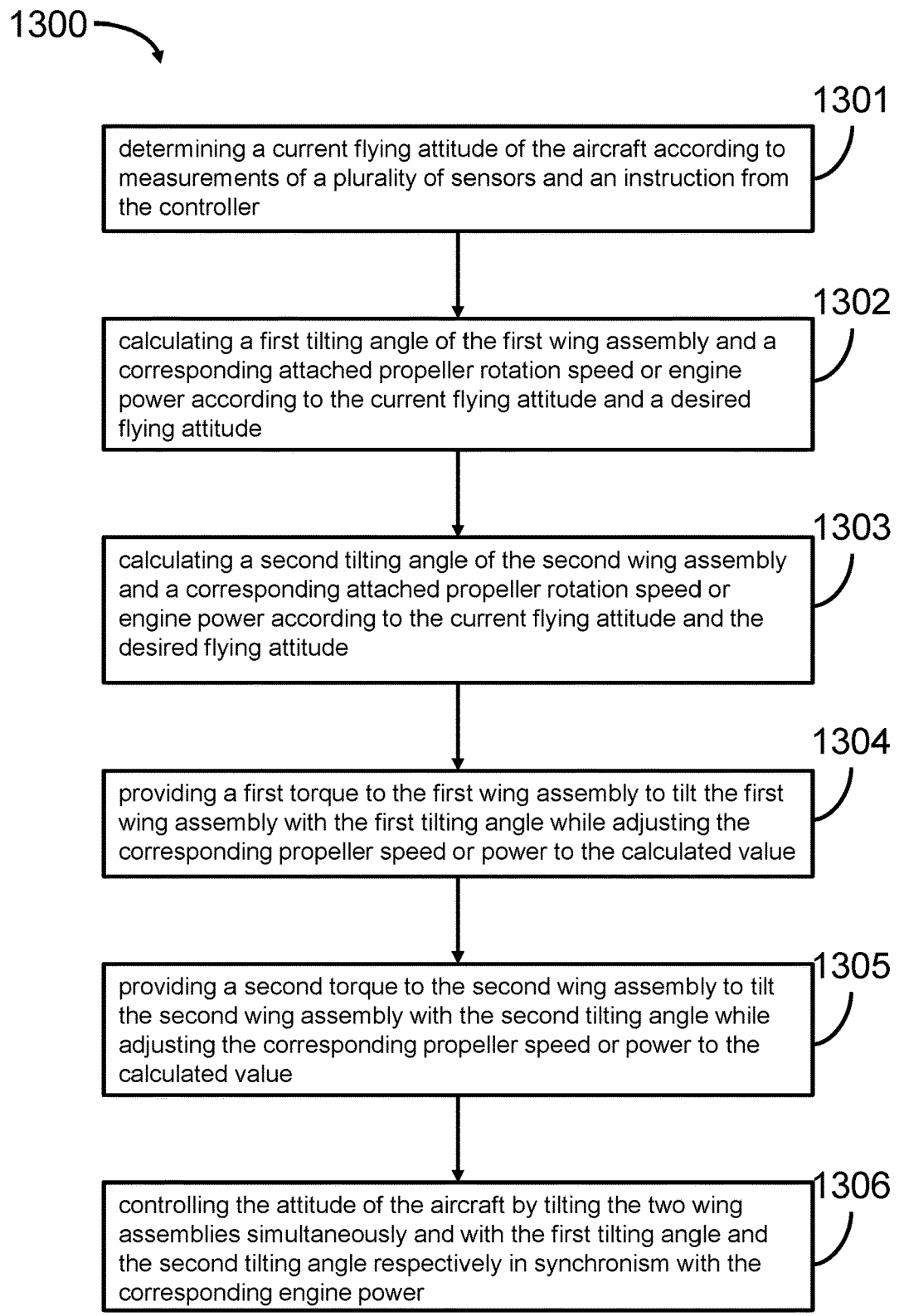
FIG. 13 shows a method for controlling the flying attitude of a tilt-wing aircraft in accordance with an example embodiment.

FIG. 13 shows a method for controlling the flying attitude of a tilt-wing aircraft. The aircraft includes a controller and two wing assemblies that are driven by two motors respectively with individual control of the engine(s) attached to the corresponding tilting wings.

Block 1301 states determining a current flying attitude of the aircraft according to measurements of a plurality of sensors and an instruction from a controller By way of example, the sensors include one or more of an accelerometer, a gravity sensor, a digital compass, one or more Global Positioning System (GPS), a temperature sensor, a wind sensor and cameras etc. The current flying attitude is determined by the controller based on a combination of the sensors' measurements.

Block 1302 states calculating a first tilting angle of the first wing assembly and a corresponding attached propeller rotation speed or engine power according to the current flying attitude and a desired flying attitude.

Block 1303 states calculating a second tilting angle of the second wing assembly and a corresponding attached propeller rotation speed or engine power according to the current flying attitude and the desired flying attitude.

By way of example, the desired flying attitude is input into the controller through a control interface. By way of example, the desired flying attitudes include taking off, hovering, landing, flying forward/backward, accelerating, decelerating, turning, shifting, rotating, and etc. By way of example, the desired flying attitudes are transmitted from a transmitting part of the controller remotely to the receiving part embedded in the aircraft main body. By way of example, the first tilting angle of the first wing assembly and the second tilting angle of the second wing assembly are calculated respectively by the controller that performs an artificial intelligent control method.

Block 1304 states providing a first torque to the first wing assembly to tilt the first wing assembly with the first tilting angle while adjusting a corresponding propeller rotation speed or engine power to the calculated value.

Block 1305 states providing a second torque to the second wing assembly to tilt the second wing assembly with the second tilting angle while adjusting a corresponding propeller rotation speed or engine power to the calculated value.

By way of example, the controller provides control signals to each motor driver to drive the motor that actuates the wing assembly, and each motor provides a torque to tilt each wing assembly accordingly.

Block 1306 states controlling the attitude of the aircraft by tilting the two wing assemblies simultaneously and with the first tilting angle and the second tilting angle respectively in synchronism with the corresponding engine power.

By way of example, the wing assemblies are tilted simultaneously and each wing assembly tilts with its individual tilting angle. The attitude of the aircraft is manipulated by cooperation of the tilting of the wing assemblies.

In one example embodiment, each wing assembly further comprises a power plant and a propeller driven by the power plant. The controller further calculates a first power output for the first power plant and a second power output for the second power plant, so that the first propeller and the second propeller generate differentiate propulsion which further increases the agility of the aircraft.

In one example embodiment, the wing assemblies are tilted to be vertical to ground, when the desired flying attitude of the aircraft is taking off from the ground, landing on the ground or hovering above the ground.

In one example embodiment, the wing assemblies are tilted with a same forward tilting angle, when the desired flying attitude of the aircraft is flying forward or accelerating.

In one example embodiment, the wing assemblies are tilted with a same backward tilting angle, when the desired flying attitude of the aircraft is flying backward or decelerating.

In one example embodiment, the first wing assembly is tilted with a forward tilting angle and the second wing assembly is tilted with a backward tilting angle, when the desired flying attitude of the aircraft is turning towards the side of the second wing assembly.

In one example embodiment, the first wing assembly is tilted upwards and the second wing assembly is tilted downwards, when the desired flying attitude of the aircraft is rotating around itself.

In one example embodiment, both wing assemblies are tilted downwards when the aircraft has flipped over and is hovering upside down.

The exemplary embodiments of the present invention are thus fully described. Although the description referred to particular embodiments, it will be clear to one skilled in the art that the present invention may be practiced with variation of these specific details. Hence this invention should not be construed as limited to the embodiments set forth herein.

What is claimed is:

1. A method for controlling an attitude of a miniature unmanned aerial vehicle (UAV), the UAV comprising a controller and two wing assemblies that are driven by two servo-motors respectively, wherein:
    the servo-motors are connected to the controller;
    the servo-motors and the controller are embedded inside the main body of the UAV;
    each wing assembly comprises a power plant and a propeller driven by the power plant; wherein:
        the power plant is arranged on the wing,
        the propeller is configured to provide propulsion for the UAV,
        wherein the rotation plane of the propeller is perpendicular to the plane of the wing;
    the method comprising:
    continuously determining, by the controller, a current flying attitude of the UAV according to measurements of a plurality of sensors;
    calculating, by the controller, a first tilting angle, a first torque of the first wing assembly, a first power output for the first power plant, and a first propelling direction of the first propeller according to the current flying attitude and a desired flying attitude;
    calculating, by the controller, a second tilting angle, a second torque of the second wing assembly, a second power output for the second power plant, and a second propelling direction of the second propeller according to the current flying attitude and the desired flying attitude;
    wherein the desired flying attitude includes air-braking, aggressive turns, flipping over, or hovering upside down;
    providing, by the first servo-motor, the first torque to the first wing assembly to tilt the first wing assembly with the first tilting angle and providing, by the first power plant, the first power output to the first propeller and the first propelling direction of the first propeller;
    providing, by the second servo-motor, the second torque to the second wing assembly to tilt the second wing assembly with the second tilting angle, and providing, by the second power plant, the second power output to the second propeller and the second propelling direction of the second propeller; and
    tilting the first wing assembly with the first tilting angle and tilting the second wing assembly with the second tilting angle in sync with the power outputs of the power plants controlled by the controller while continuously and synchronously fine-tuning the tilting angle of each wing assembly and the power output of each power plant to maintain balance of the UAV, such that high agility of the UAV is achieved;
    wherein the first and second tilting angles are configured to be at any angle from 0 to 360 degree;
    wherein the tilting angle and torque of each wing assembly are calculated to achieve a desired flying attitude in 6-axis,
    wherein the steps of calculating the tilting angle and the torque of each wing assembly are conducted using an artificial intelligence algorithm or a deep learning algorithm that learns previous control action for improved control action in next incidents and achieves high agility of the UAV.

2. The method of claim 1, the method further comprising:
    providing, by the first power plant, a larger power output than the second power plant when the desired flying attitude of the UAV is shifting to the side of the first wing assembly; and
    tilting, by the servo-motors, the wing assemblies to be vertical to the ground when the desired flying attitude of the UAV is taking off from the ground, landing on the ground or hovering above the ground;
    wherein the first and second power plant can provide appropriate power and direction in synchronism with the angle of each of the tilting wings to maintain balance of the UAV according to the control instructions inputted to the system.

3. The method of claim 1, further comprising:
    measuring, by the plurality of sensors, parameters of the UAV,
    wherein the sensors include one or more of an accelerometer, a gravity sensor, a digital compass, a Global Positioning System (GPS), a temperature sensor, a wind sensor and cameras.

4. The method of claim 1, further comprising:
    tilting, by the motors, the wing assemblies with a same forward tilting angle when the desired flying attitude of the UAV is flying forward or accelerating.

5. The method of claim 1, further comprising:
    tilting, by the motors, the wing assemblies with a same backward tilting angle when the desired flying attitude of the UAV is flying backward or decelerating.

6. The method of claim 1, further comprising:
    tilting, by the motors, the first wing assembly with a forward tilting angle and the second wing assembly with a backward tilting angle when the desired flying attitude of the UAV is turning towards the side of the second wing assembly.

7. The method of claim 1, further comprising:
    tilting, by the motors, the first wing assembly upwards and the second wing assembly downwards when the desired flying attitude of the UAV is rotating around itself.

8. The method of claim 7 further comprising:
    tilting, by the motors, both wing assemblies downwards when the UAV has flipped over and is hovering upside down.

9. The method of claim 1, wherein the servo motor comprises a reduction gear box.

10. The method of claim 1, wherein controlling the attitude of the UAV further comprises providing a control signal to the servo-motors to control the individual tilting angle and torque of each wing assembly during normal flight of the UAV to provide better aerodynamics.

* * * * *